United States Patent
Waddell

(10) Patent No.: US 10,035,465 B2
(45) Date of Patent: Jul. 31, 2018

(54) VEHICLE PLATFORM AND BARRIER

(71) Applicant: Troy E Waddell, La Pine, OR (US)

(72) Inventor: Troy E Waddell, La Pine, OR (US)

(*) Notice: Subject to any disclaimer, the term of this patent is extended or adjusted under 35 U.S.C. 154(b) by 0 days.

(21) Appl. No.: 15/677,243

(22) Filed: Aug. 15, 2017

(65) Prior Publication Data
US 2018/0050642 A1    Feb. 22, 2018

Related U.S. Application Data

(60) Provisional application No. 62/375,871, filed on Aug. 16, 2016.

(51) Int. Cl.
| | |
|---|---|
| *B60R 5/00* | (2006.01) |
| *B60R 5/04* | (2006.01) |
| *B60N 3/00* | (2006.01) |
| *B60R 11/00* | (2006.01) |

(52) U.S. Cl.
CPC ............ *B60R 5/045* (2013.01); *B60N 3/001* (2013.01); *B60N 3/008* (2013.01); *B60R 2011/008* (2013.01); *B60R 2011/0036* (2013.01); *B60R 2011/0059* (2013.01)

(58) Field of Classification Search
CPC ........ B60R 5/045; B60N 3/001; B60N 3/002; A47B 31/06
USPC .......................................................... 108/44
See application file for complete search history.

(56) References Cited

U.S. PATENT DOCUMENTS

| | | | | |
|---|---|---|---|---|
| 152,777 | A * | 7/1874 | Stickler ................. | A47B 3/083 108/131 |
| 3,709,159 | A * | 1/1973 | Oglesby, Jr. ......... | A47B 3/0912 108/129 |
| 4,494,465 | A * | 1/1985 | Fick, Jr. ................ | A47B 3/083 108/131 |
| 6,055,911 | A * | 5/2000 | Krenzer ................ | B60N 3/004 108/44 |
| 6,279,798 | B1 * | 8/2001 | Partch .................. | A01K 1/0272 224/275 |
| 6,739,269 | B1 * | 5/2004 | Benton ................. | A47B 31/06 108/152 |
| 8,365,716 | B2 * | 2/2013 | Lin ...................... | A47J 37/0786 108/44 |
| D686,384 | S * | 7/2013 | Fosburgh ....................... | D32/66 |
| D735,492 | S * | 8/2015 | Coffman ........................ | D6/555 |
| 2005/0156445 | A1* | 7/2005 | Mains ................... | B60N 3/001 296/37.16 |
| 2011/0247530 | A1* | 10/2011 | Coffman ............. | A47B 3/0911 108/116 |

(Continued)

*Primary Examiner* — Daniel J Rohrhoff
(74) *Attorney, Agent, or Firm* — Mark S. Hubert

(57) ABSTRACT

A platform that connects to the seat brackets on the floor of a vehicle by a clamping mechanism actuated by a rotatable bolt that extends from the planar top face of the platform. The platform is made in front and rear frame portions that are hingedly attached. The platform is convertible from a folded storage position to a lockable vertical configuration to form a barrier in the cargo compartment of the vehicle, or to a fully extended horizontal configuration to form a table/ sleeping platform that extends from the rear of the vehicle. A lockable, extendable ladder pivots from the back frame portion to stabilize the platform onto the ground. Adjustable legs on the frame portions enable the top faces of the two frame portions to be made coplanar.

9 Claims, 16 Drawing Sheets

(56) References Cited

U.S. PATENT DOCUMENTS

| | | | | |
|---|---|---|---|---|
| 2011/0271878 A1* | 11/2011 | Parks | ............... | B60P 3/14 |
| | | | | 108/44 |
| 2012/0325123 A1* | 12/2012 | Schoerkhuber | ........... | E05D 3/14 |
| | | | | 108/44 |
| 2014/0083335 A1* | 3/2014 | Mayhood | ............. | A47C 17/645 |
| | | | | 108/18 |
| 2017/0297468 A1* | 10/2017 | Wereski | ............. | B62D 33/0273 |

* cited by examiner

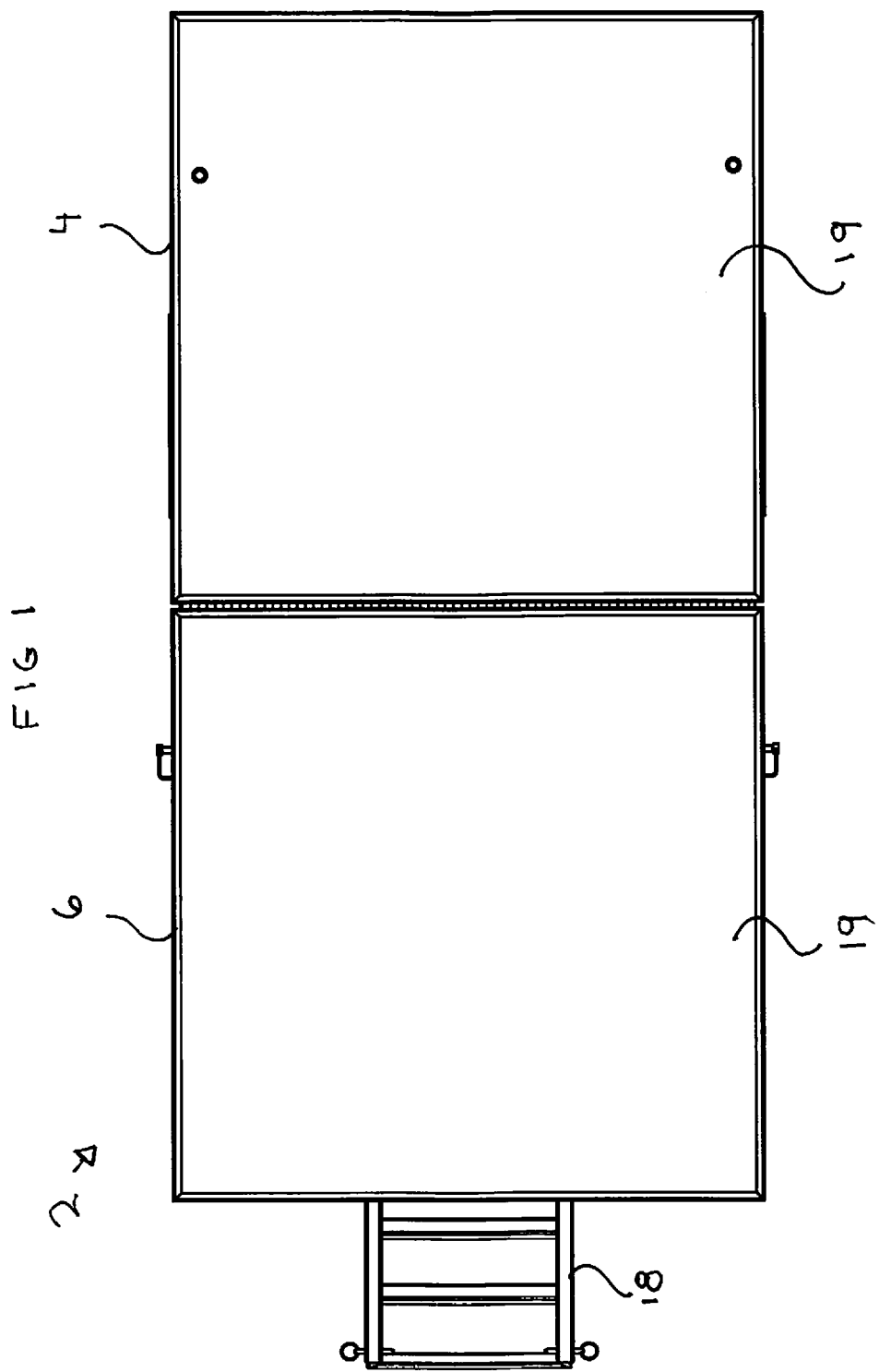

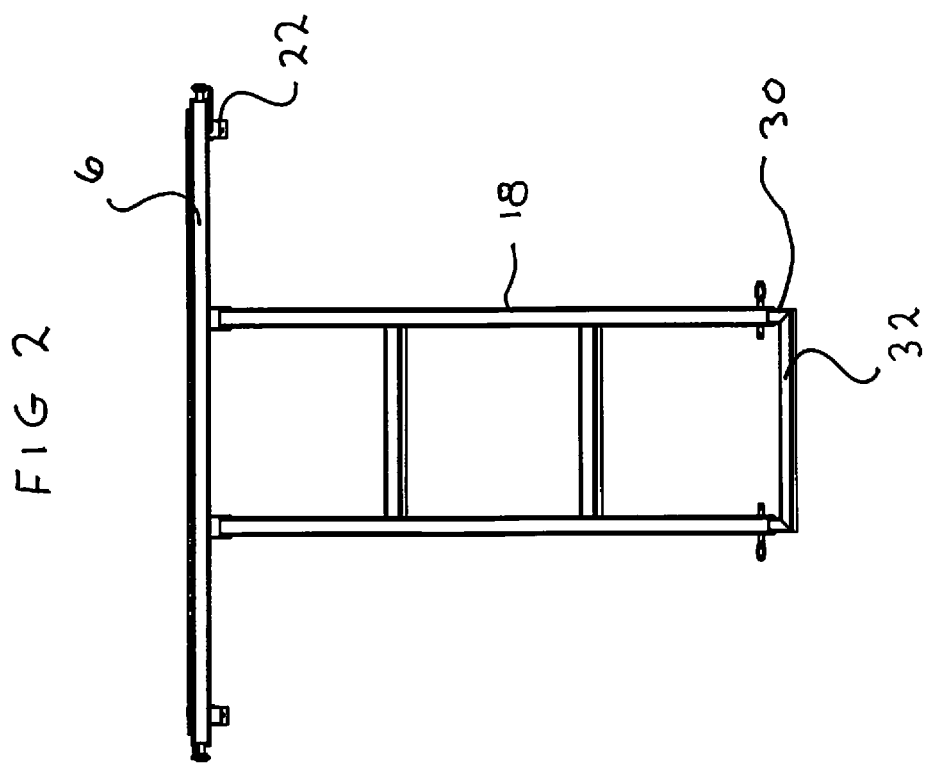

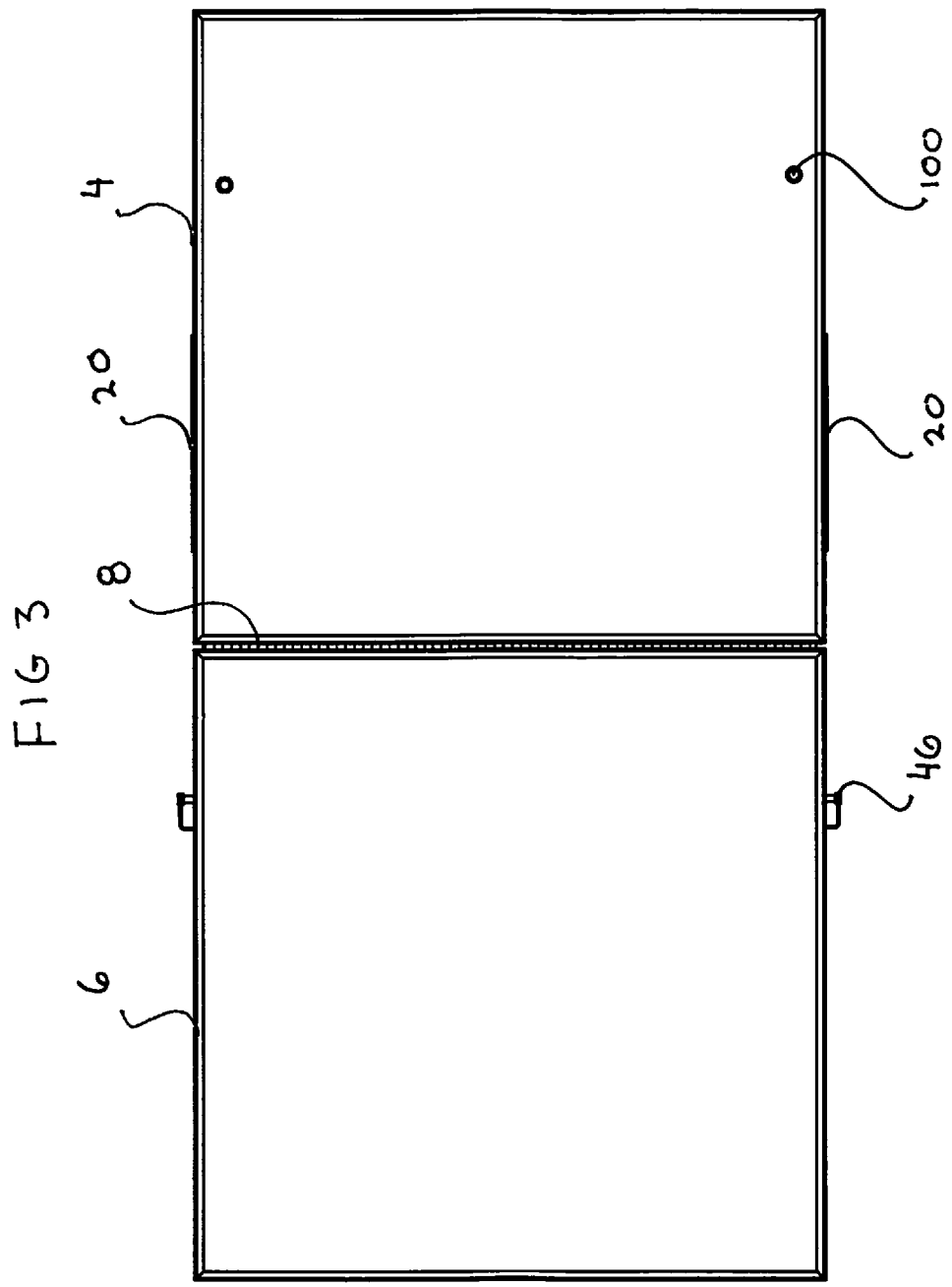

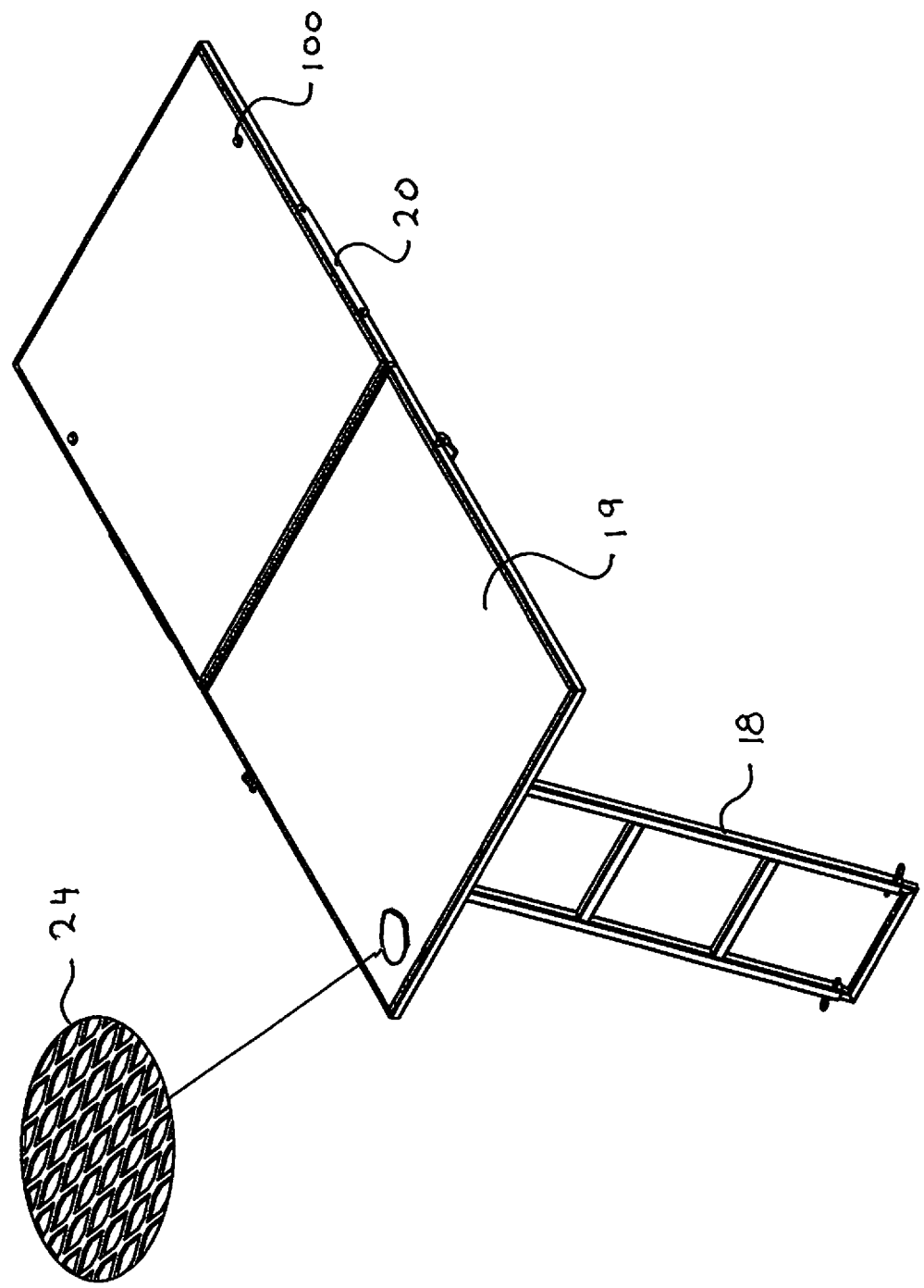

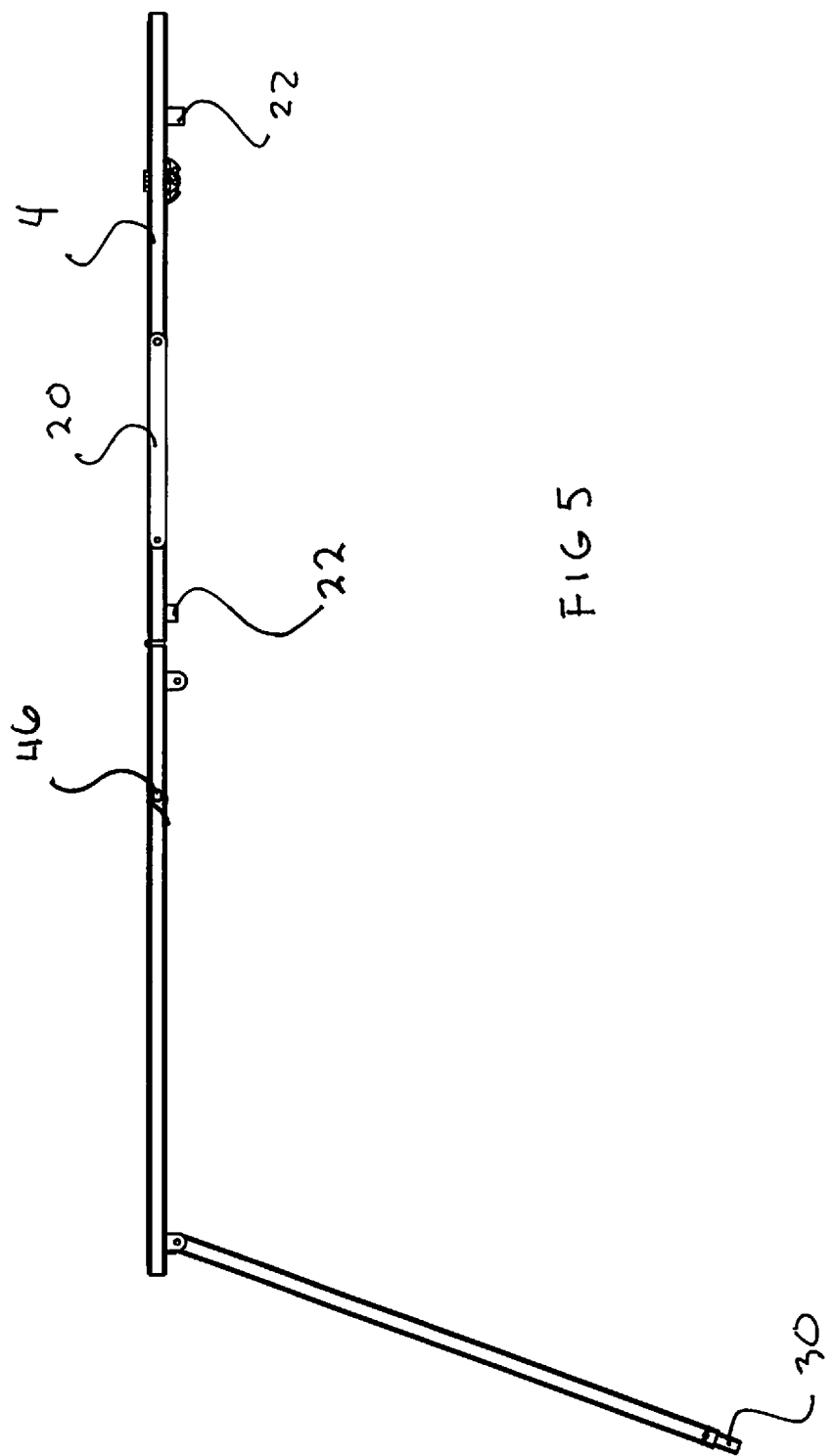

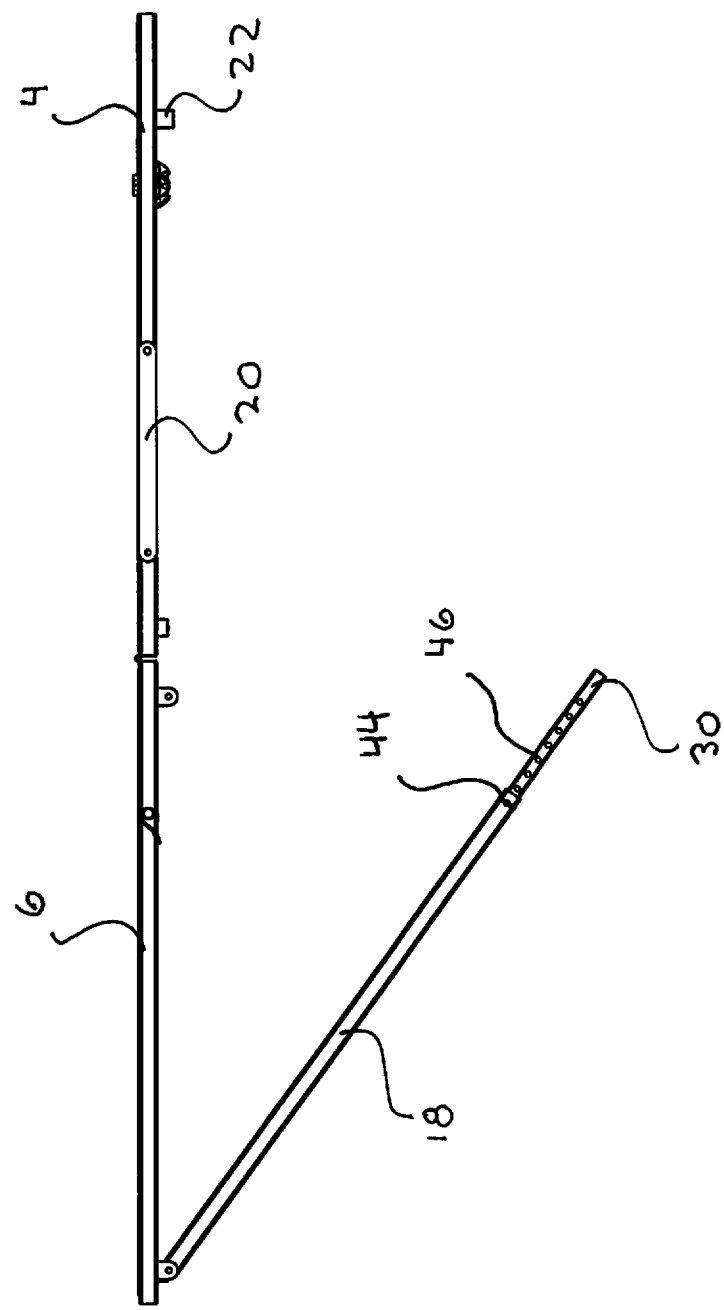

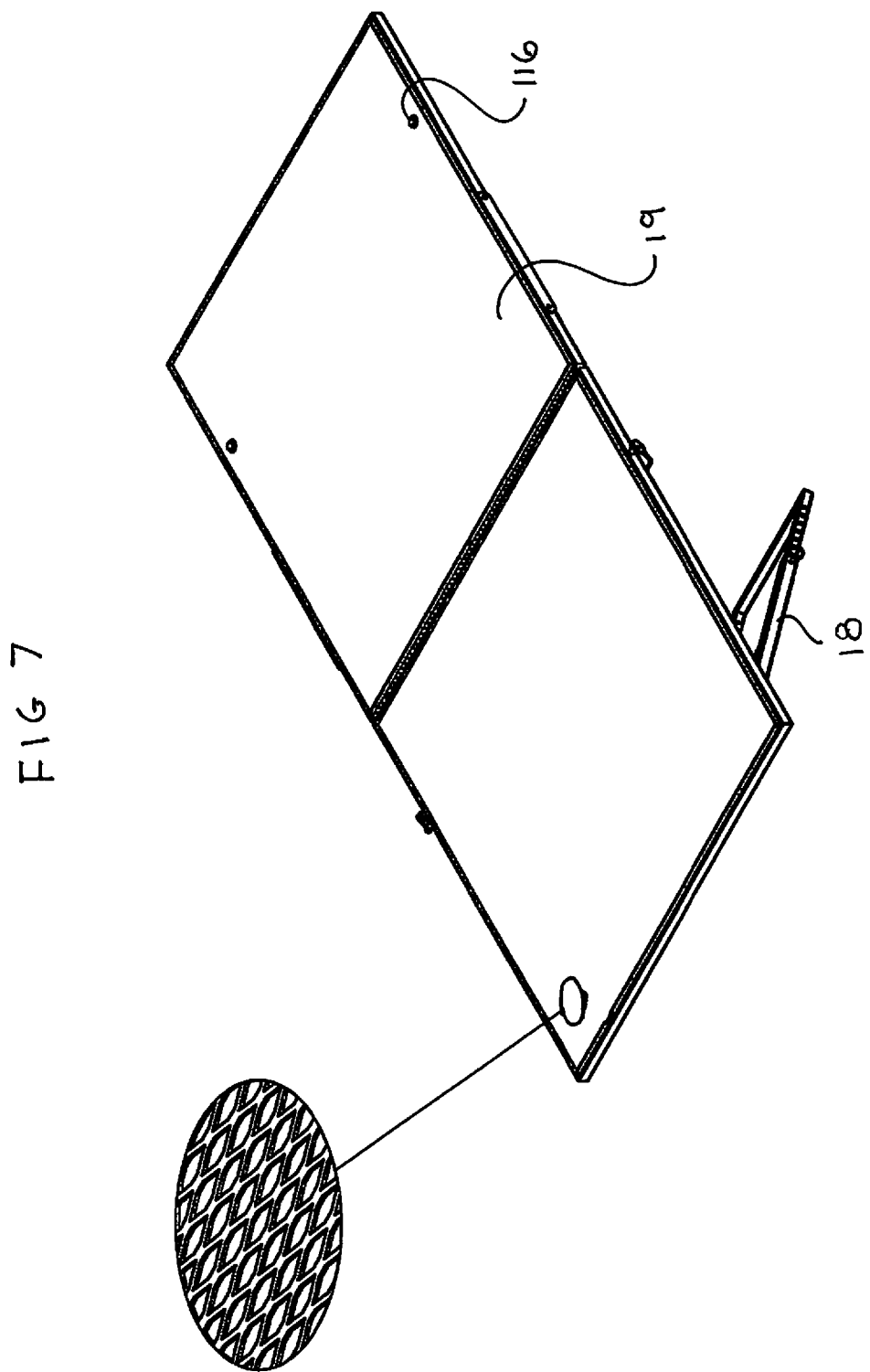

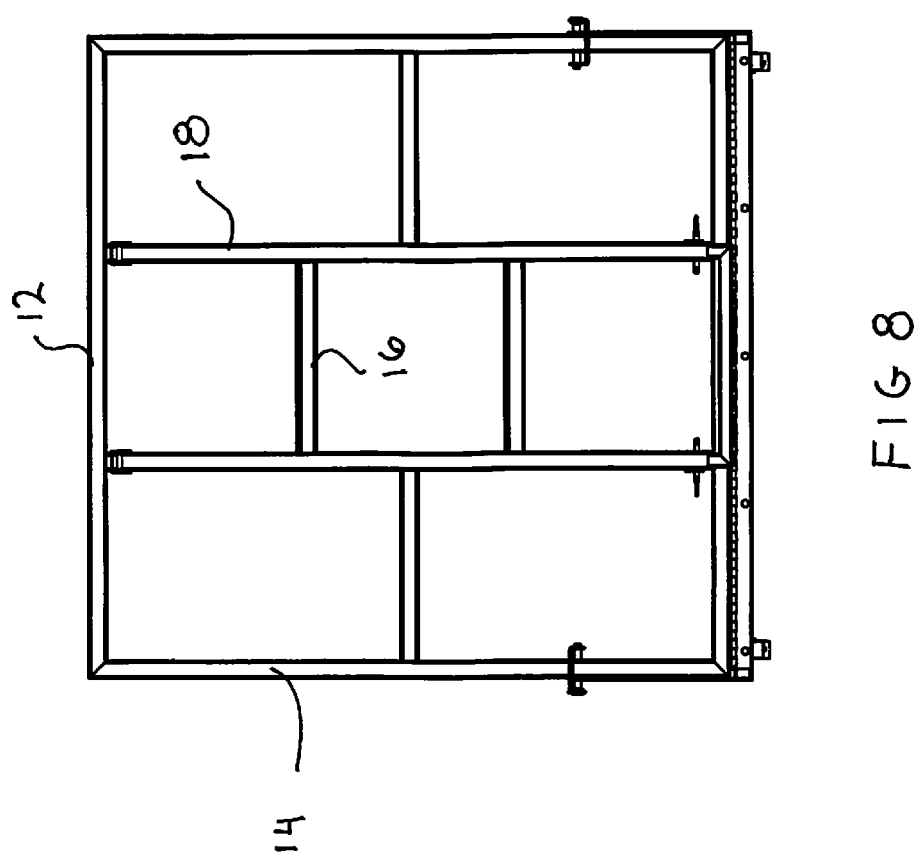

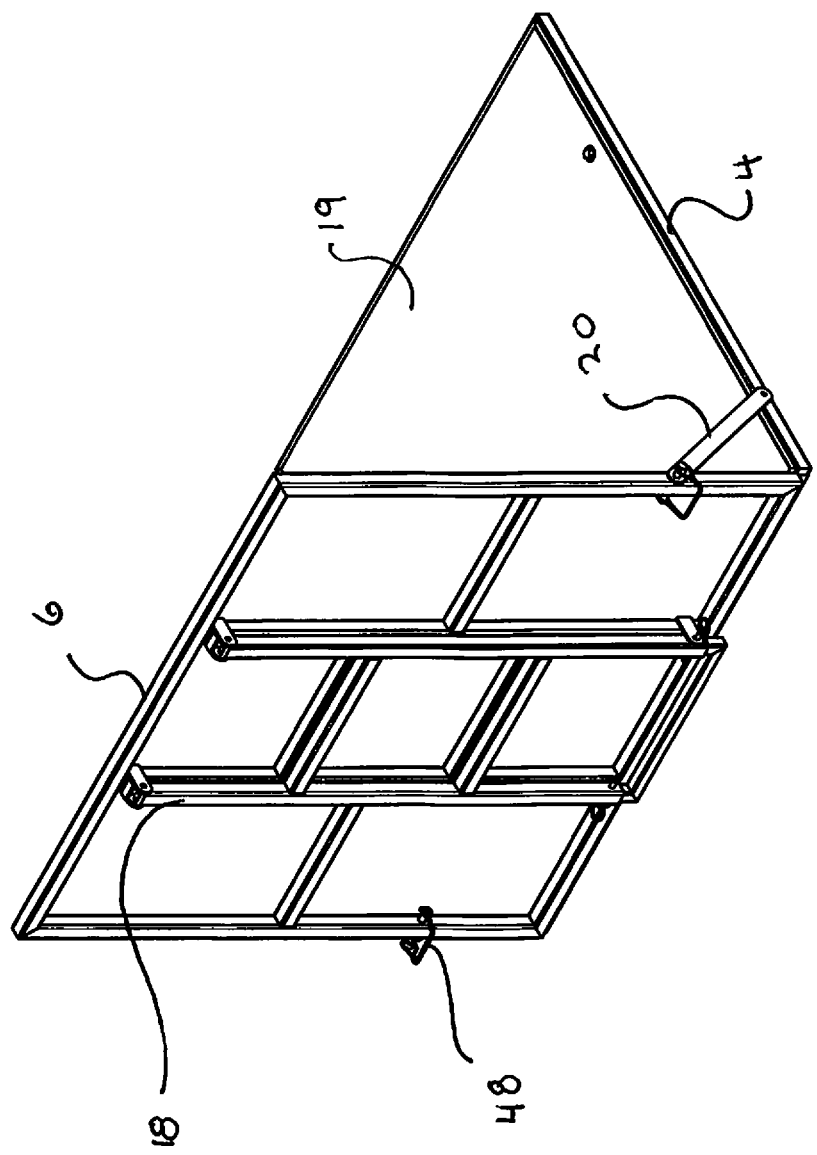

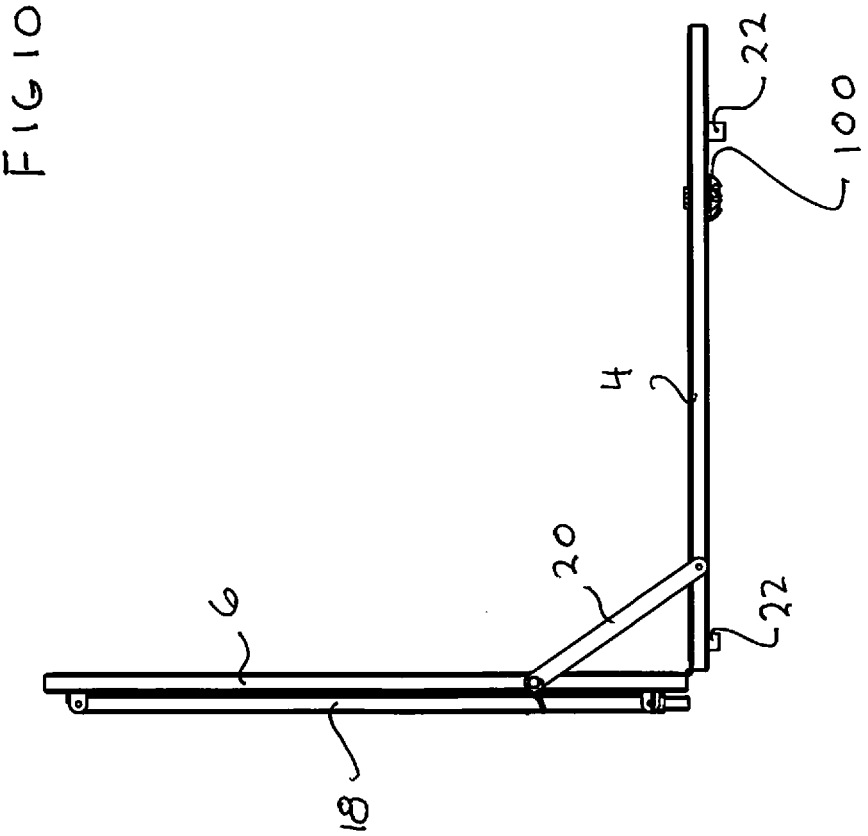

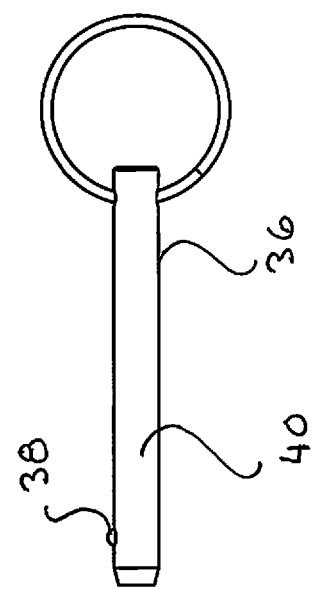

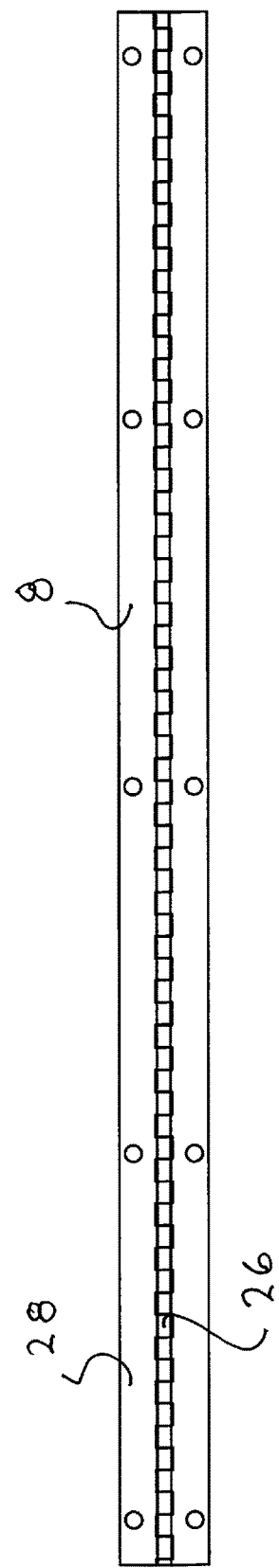

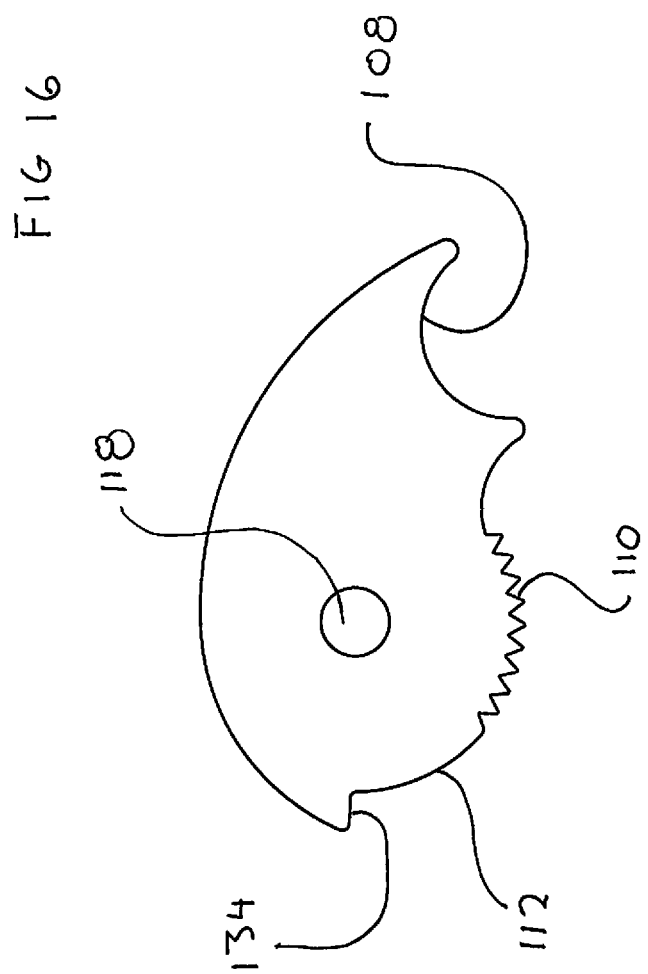

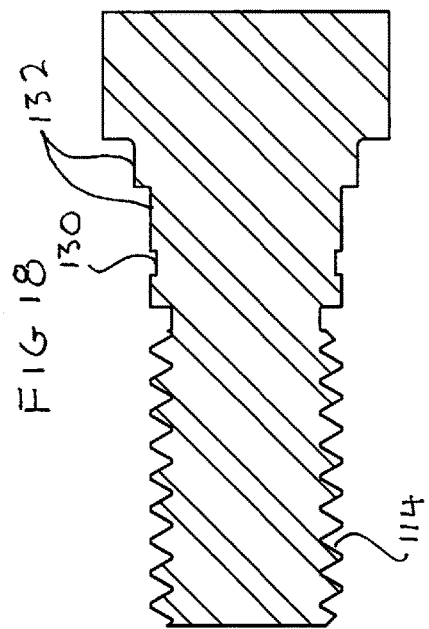
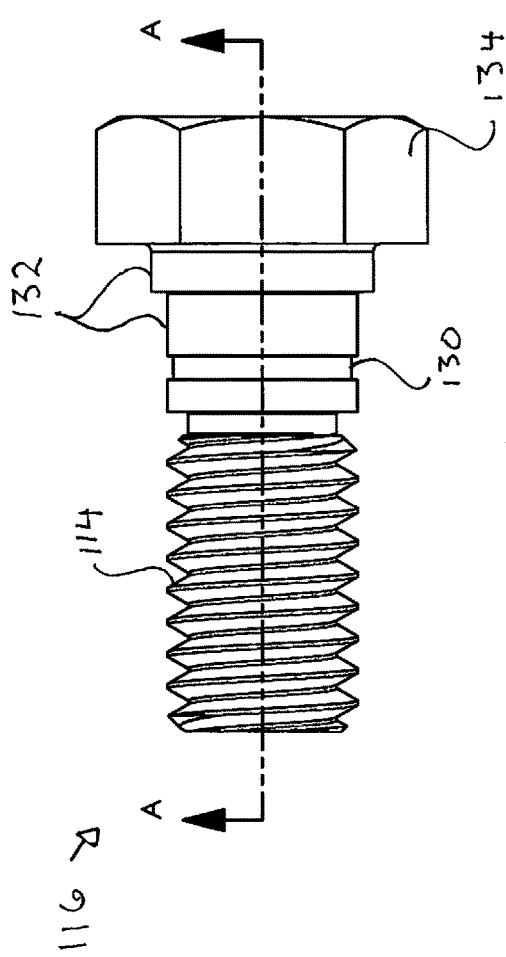

US 10,035,465 B2

VEHICLE PLATFORM AND BARRIER

PRIORITY

This patent incorporates by reference herein and claims priority to U.S. Provisional Patent Application No. 62/375,871 entitled "FOLD OUT PLATFORM FOR BACK OF VEHICLE" filed Aug. 16, 2016.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to portable, stowable platforms, and more particularly to expandable, folded vehicular platforms.

BACKGROUND

Many Americans spend an inordinate time in their vehicles on what is known as "road trips." The recreational vehicle industry is growing as many take to the roads with powerful pulling vehicles coupled to trailers or with self contained motor coaches. However, despite this growing segment of the American population, there is a strong contingent of minimalist campers and road travellers. These hearty travellers shun high levels of comfort for smaller vehicles, improved gas mileage, lower campground fees and increased mobility, not to mention overall economy. Basically, they pack and outfit their vehicles with stowable, collapsible, camping equipment having the minimal physical profiles.

Four wheel drive vehicles allow their owners the ability to get to remote wilderness locations. Albeit, the smaller these vehicles are, the more remote a location they can squeeze into. While these vehicles have smaller internal volumes to hold the traveller's gear, they also are designed with additional external cargo carrying racks, shelves and the like so they can transport as much cargo as a traditional vehicle. What these vehicles do lack however, is the internal room to sleep or spread out one's camping gear. Without a table the traveler must stoop to accomplish many camping tasks. This serves as a drawback as it forces the traveller to sleep and spread their gear out on the ground.

Henceforth, a platform that can fit into the cavity of smaller four wheel drive vehicle and double as a table and sleeping platform as well as a pet barrier, would fulfill a long felt need in the camping industry. This new invention utilizes and combines known and new technologies in a unique and novel configuration to overcome the aforementioned problems and accomplish this.

BRIEF SUMMARY

In accordance with various embodiments, an vehicular, stowable apparatus that may be expanded to provide a planar surface is provided.

In one aspect, a platform, collapsible into a physical dimension adapted to fit between the rear wheel wells of a vehicle for transportation is provided.

In another aspect, a foldable platform is provided, capable of being stored flat, directly atop of the floor in the rear cargo compartment of a vehicle and attachable to connectable members extending from the vehicle's floor or wheel wells.

In yet another aspect, an expandable, platform is provided capable of being anchored at its distal end to vehicle members and being fully folded to extend from the rear of the vehicle so as to make a bed frame, or partially folded into a vertical position to form a barrier.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 1 is a top view of a platform in its expanded state with the support ladder lowered;

FIG. 2 is a rear view of a platform in its expanded state;

FIG. 3 is a top view of a platform in its expanded view with the support ladder raised;

FIG. 4 is a perspective view of a platform in its expanded state with the support ladder raised, showing the expanded metal planar surface;

FIG. 5 is a side view of a platform in its expanded state with the support ladder lowered;

FIG. 6 is a side view of the platform in its expanded state with the support ladder partially lowered;

FIG. 7 is a top perspective view of the platform of FIG. 6;

FIG. 8 is a bottom view of the external half of the platform;

FIG. 9 is a rear perspective view of the platform with the ladder raised and the platform folded to its barrier configuration;

FIG. 10 is a side view of the platform with the support ladder raised and the platform folded to its barrier configuration;

FIG. 11 is a side view of the lock pin;

FIG. 12 is a top view of the hinge means,

FIG. 16 is a side view of one of the central lock arms;

FIG. 17 is a side view of the lock arm actuation bolt;

FIG. 18 is a side cross sectional view of the lock arm actuation bolt taken through line AA of FIG. 17;

DETAILED DESCRIPTION OF CERTAIN EMBODIMENTS

Figure 15:
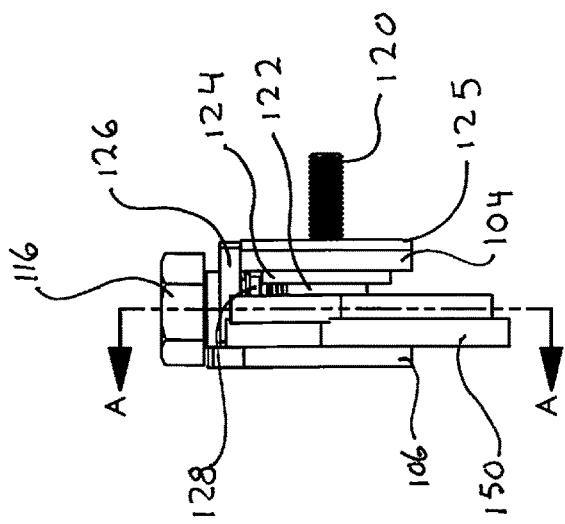
FIG. 15 is a side view of the platform locking means.
Figure 14:
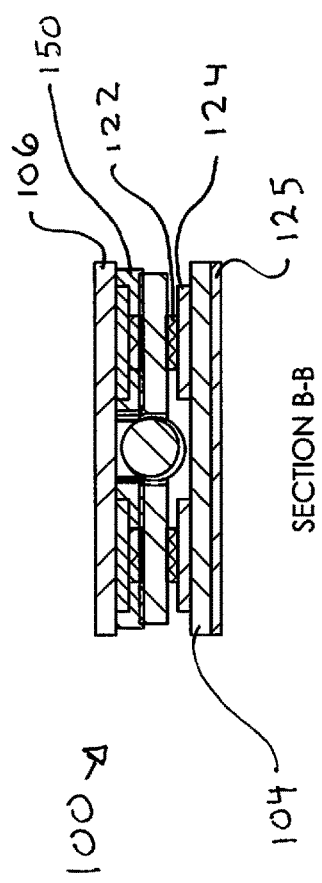
FIG. 14 is a top view of the platform locking means taken through line B-B of FIG. 13.
Figure 13:
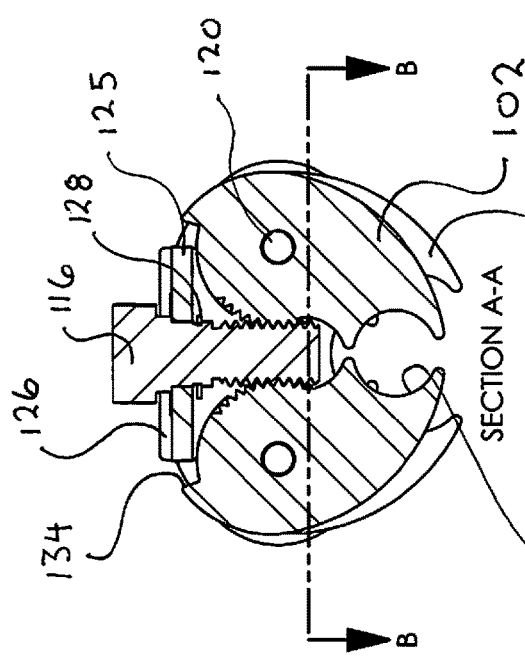
FIG. 13 is a side view of the platform locking means taken through line A-A of FIG. 15.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. The term proximal refers to the element or part of the element closest to the front of the vehicle and the term distal refers to the element or part of the element closest to the rear of the vehicle.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "locking means", "support means" , "stabilizer means" and "hinging means" as used herein including the claims, each are to be interpreted according to 35 USC § 112 [para] 6.

The present invention relates to a novel design for a foldable platform that is described as compatible with a specific type of vehicle (a two-door Jeep Wrangler® JK model years 2007 to present), although its dimensions may be modified for compatibility with any of a plethora of vehicles having similar connectable members extending from the vehicle's floor or wheel wells.

Looking at FIGS. 1, 2, 4 and 5 it can be seen that the vehicular platform 2 is made of two similarly sized rectangular frames, a proximal (front) frame portion 4 and a a distal (rear) frame portion 6, that are joined by a hinging means 8 affixed in the approximate center of the vehicular platform 2. From the rear end of the distal frame portion 6 an extendable ladder 18 is pivotally affixed. (FIGS. 8-10) At least one support means 20 is pivotally affixed on at least one side of the proximal frame portion. (In the preferred embodiment each side will have a support means 20.) A pair of locking means 100 are affixed to the proximal frame portion 4 so as to extend above and below its frame structure in alignment with the vehicle's floor mounted seat brackets. Numerous spacer legs 22 extend from the bottom faces of the frame portions.

Each of the frame portions is made of a planar metal frame 10 of mechanically connected (preferably welded or bolted) cross members 12, side members 14 and ribs 16. The construction of the proximal frame portion 4 is substantially similar to the frame of the distal frame portion 6 (FIG. 8). Each of the frame portions has a planar top face 19. These top faces may be of a smooth substrate or an expanded metal 24 as seen in FIGS. 4 and 7) When hingedly connected and the distal frame portion 6 is pivoted horizontal and rearward, their respective top faces are coplanar forming a unified platform. The length of each of the frame portions is approximately three feet so as to render an overall vehicular platform length of just over six feet. (Long enough to sleep most humans.)

The hinging means 8 in the preferred embodiment is a piano hinge (FIG. 12) as this style of hinge has a very low profile and because of its extreme length, has a small diameter hinge pin. Preferably, the height of the top of the hinging means knuckle 26 resides lower or even with the top face of the two frame portions so as to eliminate any breaks in the top plane of the vehicular platform 2 and to fill in any gaps between the two frame portions. (FIG. 3) This is possible as the two leafs 28 of the hinging means 8 are affixed to the side face of the front cross member of the distal frame portion 6 and the side face of the rear cross member of the proximal frame portion 4. The hinging means extends the full or partial length between the side members of the two frame portions. There is a plethora of other mechanical devices that may be substituted for the preferred embodiment piano hinge such as conventional door hinges, European cup hinges, butt hinges, café door pivots, rack and pinion pivots and the like.

The stabilizer means 18 in the preferred embodiment is a ladder that has hollow frame design such that two parallel extendable legs 30 connected by a bottom rail 32 may be slid down from within the ladder's hollow frame to lengthen the ladder 18. There is a pair of ladder height adjustment orifices 44 formed through the bottom end of the ladder frame (FIG. 6). There is a series of corresponding orifices 46 formed through the legs 30 that may be aligned with the ladder adjustment orifices 44 and a removeable lock pin 36 inserted to fix the length of the ladder onto the ground at whatever angle the ladder 18 is pivoted to from the rear of the distal frame portion 6.

Since the distal frame portion 6 extends past the rear extent of the vehicle, the stabilizer means 18 is pivotally connected to the distal end of the distal frame portion 6 so as to pivot into a vertical position to support the distal frame portion 6 coplanar with the proximal frame portion 4, and to keep the entire vehicular platform 2 from buckling upward in the center at the hinging means 8. It is to be adjusted so as to keep the platform 2 parallel with the floor of the vehicle. There are a plethora of other designs of stabilizing means as us well known in the art. These may include legs, poles, cables, stays, angle brackets or the like. They may be manual or hydraulically/pneumatically operated.

The top end of the frame of the preferred embodiment stabilizing means 18 (ladder) fits between two pair of matching ladder tabs 34. The tabs 34 have central orifices that align with orifices in the top end of the frame of the ladder through which a removeable lock pin 36 passes. (FIG. 11) This lock pin 36 has a spring loaded button 38 that extends above the cylindrical surface of the lock pin to secure it from exiting the orifices as is well known in the industry. The height that the tabs 34 extend from the bottom face of the distal frame portion 6 is approximately equal to the height that the spacer legs 22 extend from the two frame portions. This is to accommodate the thickness of the ladder 18 under the distal frame portion 6. In this way, the height that the two frame portions reside above the floor of the vehicle does not change whether the ladder 18 is raised (stowed position) or lowered (support position) and the top faces of the two frames remains coplanar. It also allows for the two frame portions to be supported at various positions about their bottom faces so that there is to sag or dip in the planar, unified platform.

Figure 19:
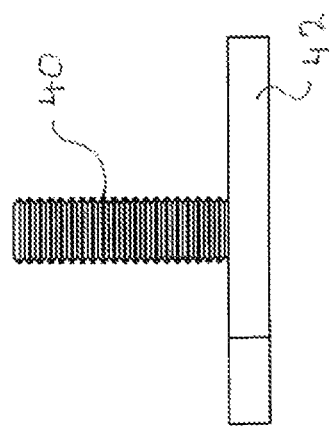
FIG. 19 is a top view of the spacer leg plate.
Figure 20:
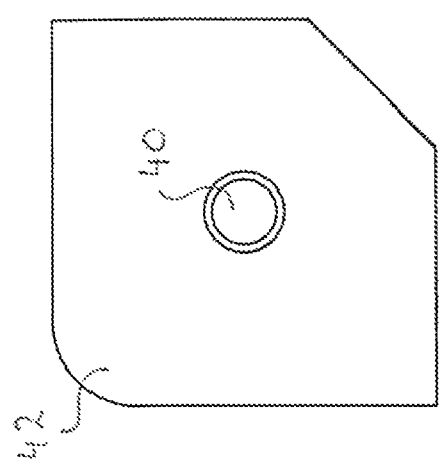
FIG. 20 is side view of the spacer leg plate.

The spacer legs 22 (FIGS. 19 and 20) are threaded posts 40 extending from plates 42 that are affixed (preferably by welding) to the bottom faces of the two frame portions along any of the cross members 12, side members 14 and ribs 16. Internally threaded polymer caps (not illustrated) may be threadingly engaged with the threaded posts 40 so as to allow height adjustment to the spacer legs 22 as is well known in the industry. This allows the two frame portions to be leveled to the vehicular floor and their top faces to be brought into a coplanar configuration. Again, the height from the bottom face of the frame portions that the spacer legs extend is equal to or slightly greater than the thickness of the ladder 18 and is approximately the same as the height of the ladder tabs 34.

Looking at FIGS. 5, 9 and 10 it can be seen that the preferred embodiment support means 20 are rigid linear members pivotally attached at its proximal end to the sides of the proximal frame portion 4, and having an orifice at its distal end. There is a pair of locking orifices 46 formed through the sides of the distal frame portion 6 into which the orifice at the distal end of the support means 20 can be aligned for the passage of a lock pin 36 when the distal frame portion 6 is raised to a vertical position. (There are similar orifices formed in the sides of the proximal frame portion 4 behind the support means pivotal attachment that function is a similar manner to hold the support means adjacent the side of the proximal frame portion when the distal frame portion 6 is not raised. The spacing and location of the orifices in the distal frame portion 6 is such that the distal frame portion 6 may be pivoted upward into a vertical position and the support means pivotally released from the side of the proximal frame portion 4 so that their orifices align and a lock ring 48 may be inserted. This forms a vertical barrier in the back cargo area of the interior of the vehicle and the rear end of the proximal frame portion 4. This may be used as a pet cage. There are a plethora of other mechanisms that could be substituted for the preferred embodiment support means 20 including but not limited to cables, rods, rope, elastic cords and the like.

The clamping means 100 operates by closing an opposing pair of moveable jaws that are mounted in their jaw housing to the proximal frame portion, around the floor mounted seat brackets. These brackets are "U" shaped sections of round stock that extend upward from the floor of the vehicle that the rear seat's locking mechanism clamp around. When the rear sets are removed from the vehicle there is enough room in the rear compartment of the vehicle to accommodate the folded vehicular platform 2.

Looking at FIGS. 13-16 it can be seen that moveable jaws are two identical cam plates 102 held in an opposing, mirror image configuration between two parallel side plates 104 (inner side plate) and 106 (outer side plate). Beside the outer face of the inner side plate 104 is the housing plate 125. The housing plate 125 has an "L" configuration with a top shoulder 126 extending perpendicularly from its top edge.

The top shoulder 126 has an opening therein to allow passage of the shaft of the lock bolt 116. This top shoulder 126 resides perpendicular to the side plates and spans across the space between the tops of the side plates.

On either side of the cam plates are two spacers 122 that minimize the frictional contact as the cam plates rotate between their open and closed positions. Between the spacers 122 and the side plates 104 and 106 are retention ring plates 124. A stabilizer plate 150 enshrouds the spacers 122 and the retention ring plates 124 between one side of the cam plates 102 and the outer side plate 106. Between the top edge of the retention ring plates 124 and the top shoulder 126 is a space to accommodate the retention ring 128 which fits about the retention ring groove 130 in the lock bolt 116 below the top shoulder 126. This retention ring 128 constrains the lock bolt in the clamping means 100 and holds the lock bolt vertically stationary and in threaded engagement with the threads on the two cam plates 102.

The cam plates 102 have semi-circular cutouts 108 at their bottom end and a toothed profile 110 on the edge of the plate between the heel 112 of the cam and the cutouts 108. The profile of the teeth are configured for mating engagement with the thread 114 on the lock bolt 116. (FIGS. 17 and 18) Through each of the cam plates are orifices 118 through which the two mounting bolts 120 pass and about which each cam plate 102 can rotate.

The two cam plates 102, four spacers 122, housing plate 125, four retention ring plates 124 and two side plates 104 and 106 all have orifices that align such that a pair mounting bolts 120 may pass through the clamping means 100 and be used to mechanically attach it to the proximal frame portion 4.

The opening therein the top shoulder 126 of the housing plate has a stepped orifice that matingly conforms to the stepped neck 132 of the lock bolt 116. These steps/shoulders also help to vertically stabilize the lock bolt 116 within the clamping means 100.

The clamping means functions as follows: the head 134 of the lock bolt 116 extends from the top shoulder 126 of the clamping means 100. A socket or wrench may be placed onto the lock bolt 116 and rotated. The spinning thread 114 on the lock bolt 116 (which is located between the two cam plates 102 and engages their toothed profiles 110) will cause the two cam plates 102 to rotate around the mounting bolts 120 which draws the semi-circular cutouts 108 (collectively the "jaws") together (jaw closed configuration) or apart (jaw open configuration). The opening of the cam plates 102 is limited as there is a top shoulder 134 on the cam plates 102 which will abut the top shoulder 126 when the cam plates 102 are drawn fully open. When drawn closed completely, the cam plate's semi-circular cutout 108 encircles the "U" shaped seat brackets, anchoring the proximal frame portion 4 to the floor of the vehicle.

In operation, the rear seats of the vehicle are removed so as to expose the seat floor brackets. The platform 2 is placed in its folded configuration with the top faces 19 of the two frame portions 4 an 6 in contact; the support means 20 affixed to the side of the proximal frame portion 4; the extendable legs 30 inserted fully into the ladder's hollow frame; and the stabilizer means 18 raised and locked below the bottom face of the distal frame portion 6. The lock bolt 116 is rotated until the cam plates 102 are fully open 200 and the top shoulders 134 on the cam plates 102 have contacted the top cover 126. The platform 2 is lifted into the rear compartment of the vehicle such that the open jaws of the clamping means 100 may each be placed atop and around the seat brackets and the proximal frame portion 4 placed onto the floor of the vehicle with its spacer legs 22 holding the platform 2 in an adjustable spaced configuration from the floor just slightly greater than the thickness of the stabilizer means 18. The lock bolt 116 (which is accessible through openings in the top face of the proximal frame portion 4) is rotated until the cam plates 102 rotate to close the semi-circular cutouts 108 tightly into contact with and around the seat brackets. (This lock position is seen with the cam plates 102 in the position indicated as element 200 in FIG. 13.) The platform 2 is now secured to the vehicle and constrained from both vertical and horizontal movement. The distal frame portion 6 may be pivoted into a vertical configuration. At this time, the distal end of the locking means 20 may be released from the side of the proximal frame portion 4 and pivoted for alignment with the orifice in the distal frame portion 6 for insertion of a retention ring 128, or alternately, the lock pins may be removed from the stabilizer means 18 and the stabilizer means 18 pivoted rearward as the distal frame portion 6 is lowered until the spacer legs 22 contact the vehicle floor. The stabilizer means 18 may be lowered until it touches the ground and its lock pin inserted.

While certain features and aspects have been described with respect to exemplary embodiments, one skilled in the art will recognize that numerous modifications are possible.

System components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, it will be appreciated that the invention is intended to cover all modifications and equivalents within the scope of the following claims.

The invention claimed is:

1. A foldable, planar vehicular platform comprising:
    a generally planar frame, said frame having a proximal frame portion having a front edge, a rear edge, a planar proximal top face and two first sides, said proximal frame portion hingedly coupled lo a distal frame portion having a proximal edge, a distal edge, a planar distal top face and two second sides;
    a stabilizer means pivotally affixed to said distal edge;
    at least two locking means extending from a bottom face of said proximal frame portion;
    a hinging means operationally connected between said rear edge and said proximal edge;
    at least one support means connectable between one of said two first sides and one of said two second sides so as to establish and support said distal frame portion in a vertical orientation that is perpendicular with respect to a horizontal orientation of said proximal frame portion;
    wherein each of said locking means has a closeable jaw that can removeably connect said proximal frame portion to a seat bracket; and
    wherein said distal frame portion may be pivoted from atop said proximal frame portion such that said distal top face and said proximal top face form a common horizontal plane residing at least partially above a floor of a vehicle; and
    wherein said stabilizer means may be pivoted into a vertical position so as to establish and support said distal top face in said common horizontal plane.

2. The foldable, planar vehicular platform of claim 1 wherein said stabilizer means is an adjustable length ladder that may be locked at various lengths of adjustment.

3. The foldable, planar vehicular platform of claim 1 further comprising spacer legs affixed to a bottom face of said proximal frame portion and a bottom face of said distal frame portion, said spacer legs adjustable in height so as to aid with the coplanar alignment of the proximal top face to the distal top face.

4. The foldable, planar vehicular platform of claim 1 wherein the number of support means is two.

5. The foldable, planar vehicular platform of claim 4 wherein said support means are pivotally affixed to said first side and engageable for connection to said second side.

6. The foldable, planar vehicular platform of claim 5 wherein each of said locking means comprises:
    a pair of substantially similar opposing cam plates residing in a mirror image configuration, each rotatable about a orifice formed there through, said cam plates having a semi-circular cutout formed thereon and a toothed configuration simultaneously engageable with a rotatable threaded bolt;
    wherein rotation of said bolt rotates said cam plates to separate or draw together said semi-circular cutouts so as to enable a clamping jaw.

7. The foldable, planar vehicular platform of claim 6 wherein said lock means further comprises:
    a pair of side plates containing said cam plates;
    at least one spacer on either side of said cam plates; and
    at least one retention ring plate between said spacers and said side plates.

8. The foldable, planar vehicular platform of claim 1 wherein each of said locking means comprises:
    a pair of substantially similar opposing cam plates residing in a mirror image configuration, each rotatable about a orifice formed there through, said cam plates having a semi-circular cutout formed thereon and a toothed configuration simultaneously engageable with a rotatable threaded bolt;
    wherein rotation of said bolt rotates said cam plates to separate or draw together said semi-circular cutouts so as to enable a clamping jaw.

9. The foldable, planar vehicular platform of claim 8 wherein said hinging means is a piano hinge.

* * * * *